US006969972B2

(12) United States Patent
Formenti

(10) Patent No.: US 6,969,972 B2
(45) Date of Patent: Nov. 29, 2005

(54) ARCHITECTURE FOR SWITCHING BETWEEN AN EXTERNAL AND INTERNAL POWER SOURCE

(75) Inventor: Jose Antonio Vieira Formenti, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/456,361

(22) Filed: Jun. 6, 2003

(65) Prior Publication Data

US 2005/0017766 A1 Jan. 27, 2005

(51) Int. Cl.⁷ .............................................. H01M 10/46
(52) U.S. Cl. ..................................................... 320/128
(58) Field of Search ................................ 320/107, 124, 320/127, 128, 137

(56) References Cited

U.S. PATENT DOCUMENTS

| 5,604,655 | A | * | 2/1997 | Ito ................................ 361/56 |
| 6,288,522 | B1 | * | 9/2001 | Odaohhara et al. ......... 320/138 |
| 6,329,796 | B1 | * | 12/2001 | Popescu ...................... 320/134 |
| 6,465,984 | B2 | * | 10/2002 | Fukuoka et al. ............. 320/112 |
| 6,566,766 | B2 | * | 5/2003 | Matsuda et al. .............. 307/82 |

* cited by examiner

*Primary Examiner*—Edward H. Tso
(74) *Attorney, Agent, or Firm*—W. Daniel Swayze, Jr.; W. James Brady; Frederick J. Telecky, Jr.

(57) ABSTRACT

The present invention comprises a combination of a new circuit topology utilizing microcontroller (202, 302) and a modified logic control circuit which enables the replacement of a Schottky diode, commonly used in series with AC adapter, by a MOS transistor switch (212, 312) to implement airline mode operation of a system, with the added benefits of more efficient power dissipation and minimization of sparking or arcing at the power input terminal.

22 Claims, 3 Drawing Sheets

ARCHITECTURE FOR SWITCHING BETWEEN AN EXTERNAL AND INTERNAL POWER SOURCE

BACKGROUND OF THE INVENTION

1. Technical Field of the Invention

The present invention generally relates to power management sections comprising methods of monitoring and switching between external and internal power sources in a system, and means of facilitating the recharge of rechargeable internal power sources such as battery packs. These power management sections are adapted to sense when a source has been coupled to an input terminal and also to recharge, when appropriate, said internal power sources. Such power management systems are typically used in electronic devices, such as notebook computers.

2. Description of Related Art

Power management sections facilitate the powering of systems and devices that require a stable output voltage from one of a plurality of power sources. Many electronic device applications require these power management sections as they are adapted to receive power, for example, from an AC wall source or an external or internal DC source. Power management sections have been developed to control and regulate power to a system from several sources. Often, these systems can be powered from one of several sources, including an AC source, an internal DC source, such as a battery, or an external DC power source such as a car or airline adapter. The battery packs used in these systems are usually rechargeable types, such as NiCd, NiMH, Li-Ion, and Li-Pol battery packs. In addition to powering the system, AC or wall sources or external DC sources also are used to recharge these battery packs.

In notebook computer systems, the primary function of the power management section is to charge the battery pack and guarantee power continuity to the system. These functions are often implemented with the use of dedicated integrated logic circuits ("ICs") or a combination of microcontroller and discrete analog and digital components such as oscillators, comparators and logic gates. In order to perform the power switch and battery pack recharging functions, conventional circuit topologies use a set of power switches (usually MOS transistors) and discrete diodes. Typically a power diode is required to isolate the adapter from internal nodes, and the MOS transistors are controlled to isolate the AC adapter from the battery or load. A buck converter uses the adapter power to recharge the battery.

Usually the input power is switched to the system when the AC adapter voltage is above the target charge voltage. There are some instances, however, when the AC adapter voltage must be switched to the system even if it is lower than the battery voltage. This condition is normally referred to as "airline" mode operation and is required when the end equipment must be powered from an external supply which voltage is lower than the pack voltage. Disadvantageously, conventional topologies are unable to implement airline mode. In such cases, the system continues to run off the higher voltage battery pack even with the external DC source or AC adapter wall source connected to the device, thus discharging the battery pack until the pack voltage matches the external supply voltage. To implement airline mode using conventional topologies at least 2 additional switches and external control logic must be added to block the conduction path from battery to system. This increases the system cost and decreases overall system efficiency, as the series resistance from the battery pack to the system is increased.

SUMMARY OF THE INVENTION

The present invention comprises a combination of a new circuit topology and a modified logic control circuit which enables bypassing the Schottky diode commonly used in series with AC adapter with a MOS transistor switch. This new topology effectively, reduces the overall power dissipation for the system when operating from adapter power. In addition, a new configuration for the power switches is introduced which enables the implementation of airline mode with fewer switches, when compared to conventional topologies.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof. For a more complete understanding of the present invention, reference is made to the following detailed description taken in conjunction with the accompanying drawings wherein.

DETAILED DESCRIPTION OF THE INVENTION

Figure 1:
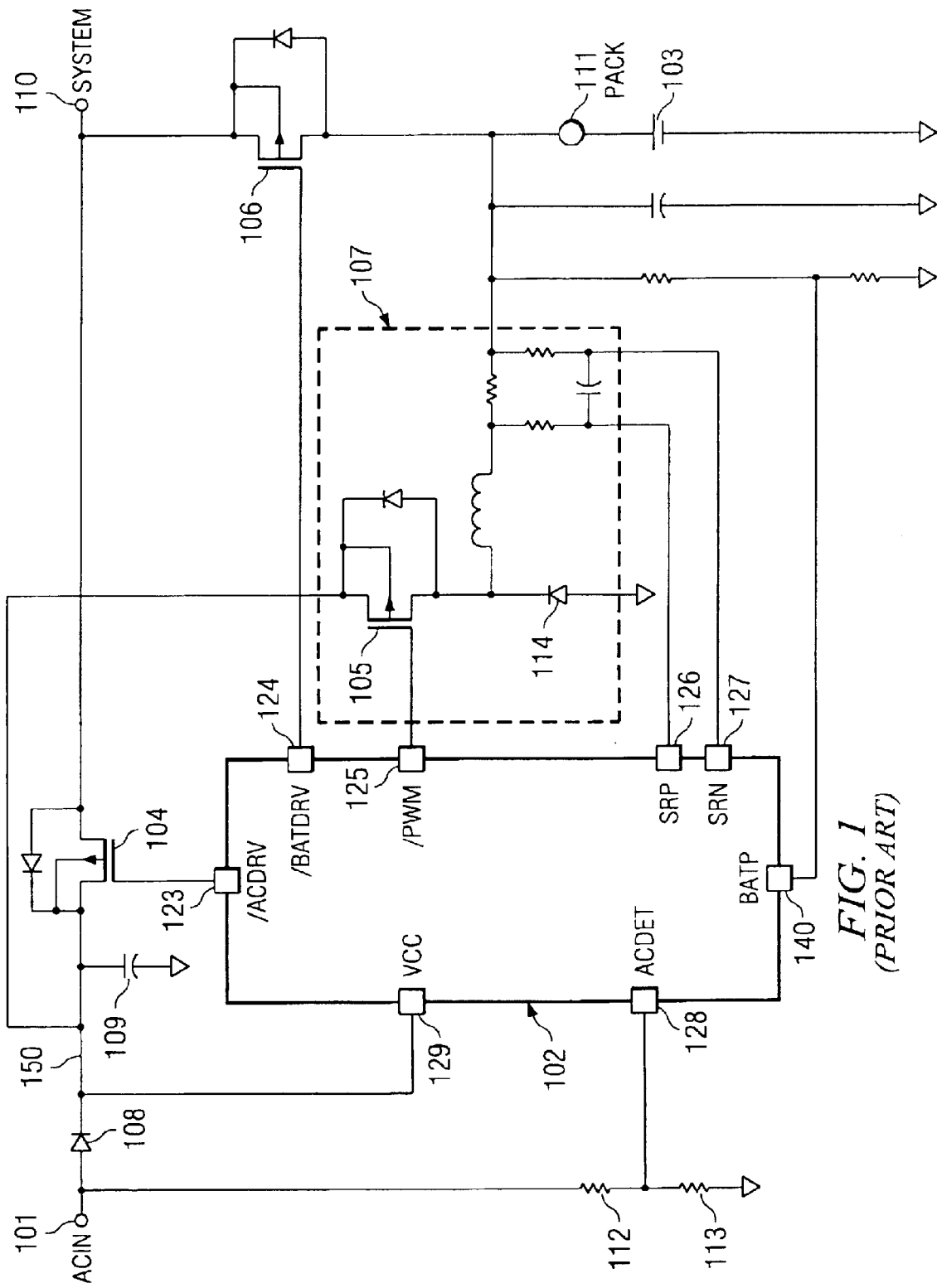
FIG. 1 illustrates a conventional power supply regulation and switching circuit.

While the invention has been described with reference to illustrative embodiments, this description is not intended to be construed in a limiting sense. For example, the illustrative embodiments are implemented using single gate, enhancement mode PMOS transistors. Various other embodiments, for example, using transistors with opposite polarities and modes, or multiple gates, will be apparent to persons skilled in the art upon reference to this description. It is therefore contemplated that the disclosed and appended claims will cover any such modifications of the embodiments as fall within the true scope and spirit of the invention. Throughout the drawings, it is noted that the same reference numerals will be used to designate like or equivalent elements having the same function. Detailed descriptions of known functions and constructions unnecessarily obscuring the subject matter of the present invention have been omitted for clarity.

In systems such as notebook computers, the primary function of the power management section is to recharge the battery pack and guarantee power continuity to the system. These functions are often implemented with use of dedicated integrated circuits ("ICs") or a combination of microcontroller and discrete components. The power into the power management section is either from an external source such as an AC adapter or DC source or an internal power source such as a battery pack. In order to perform the power switching and battery recharging functions, conventional circuit topologies use a set of power switches, typically MOS transistors, that can be controlled to isolate the adapter from the battery or load and a buck converter that can be switched in series from the adapter terminal to the battery. A commonly used topology used in notebook computers to implement power switching to the system and battery recharging is seen in FIG. 1.

FIG. 1 illustrates a conventional power supply regulation and switching circuit. As seen therein, power for the system derives either from an external power source, e.g., an AC wall source, introduced at adapter terminal 101, or from an internal source, such as a battery 103, introduced at terminal 111. Power is output to the system at system terminal 110. Controller 102 drives transistors 104 and 106 to switch between adapter terminal 101 and battery terminal 111, and further, as seen therein, regulates power from the adapter terminal 101 to the battery 103 for recharge by controlling buck converter 107. A Schottky diode 108 is added to isolate the adapter voltage 101 from system terminal 110, thus preventing current flow from system terminal 110 to adapter 101 via the backgate diode of switch 104 or from the battery 103 to the adapter terminal 101 via the backgate diode of switch 106 and backgate diode of switch 104. The buck converter circuit 107 facilitates use of power from the external source at the adapter terminal 101 when the voltage from that source is higher than the battery 103 voltage. The buck converter 107 duty cycle is set by the controller 102 to achieve the desired charge current and charge voltage. The charge current information is fed back to the controller 102 through pins 126 SRP and 127 SRN. The battery 103 voltage is attenuated via an external resistive divider and fed back to the controller via pin BATP 140. In addition to that the duty cycle signal 125 /PWM is level shifted to provide the necessary gate voltage levels for the external PMOS transistor 105. The diagram of FIG. 1 displays a non-synchronous converter, however it should be noted that a synchronous converter can also be used without affecting the implementation of the present invention.

Controller 102 is a typical battery charge controller and selector, such as the Texas Instruments bq24701, that contains the logic and drivers that control the plurality of transistors in the power management section. When power is attached to the adapter terminal 101, it is detected at ACDET pin 128, through the resistor divider circuit of resistor 112 and resistor 113. The controller 102 connects either the AC adapter terminal 101 or battery terminal 111 to the system terminal 110 by controlling switches 104 and 106, respectively. Transistor 106, driven by /BATDRV pin 124 of controller 102, switches power from the battery 103 to the system terminal 110. /ACDRV pin 123 drives the external PMOS transistor 104 used to switch to the external power supply, such as an adapter, as the power source. /PWM pin 125 is a gate drive output pin that drives the PMOS transistor 105 for PWM control. The functions provided by controller 102 can also be performed by a micro-controller and/or discrete circuit elements such as oscillators, comparators and logic circuits.

There are several disadvantages with this conventional circuit. First, adapter diode 108 is required to isolate the adapter at adapter terminal 101 from the system 110 and battery 111 terminals. New systems have loads ranging from 3 amperes to 10 amperes or higher. As a result, the power dissipation generated by diode 108 is significant and it contributes to increase the internal temperature of the end equipment. It is not possible to simply replace diode 108 with a transistor or other switch, using the AC switch control signal from controller 102, as capacitor 109 will hold the adapter voltage high if the adapter is removed from adapter terminal 101 when such an AC switch is on. Secondly, the topology shown in FIG. 1 cannot be used to implement airline mode, as the intrinsic backgate diode in transistor 106 will power the system terminal 110 from battery terminal 103 if the battery terminal voltage is above the adapter terminal 101 voltage. Finally, connecting the buck converter switch source to capacitor 109, as shown in FIG. 1, results in increased capacitance at node 150, as the capacitor 109 filters the ripple current required by the buck converter 107 when a battery pack is being charged. Upon connection of an external supply to adapter terminal 101 this capacitive load is charged with inrush current being limited by diode 108 impedance. Usually this impedance is very small, resulting in very high inrush peak currents at adapter terminal 101. This generates sparks at the adapter terminal during adapter insertion with possible oxidation of contacts and long term reliability issues.

Therefore, a circuit topology is desired which is able to (i) reduce the amount of power through the adapter diode 108, (ii) open the discharge path from the battery pack 103 to system terminal 110 when the voltage at terminal 101 is below the battery voltage 103 and (iii) reduce the capacitive load responsible for inrush current during adapter connector insertion. The present invention accomplishes these objectives with a combination of a new circuit topology and new control logic functions. Advantages of the present invention include more efficient power dissipation when the external power source is recharging the battery and powering the system. The present invention advantageously enables the implementation of airline mode with minimum external switch count, thus reducing power management section cost when implementing airline mode.

Figure 2:
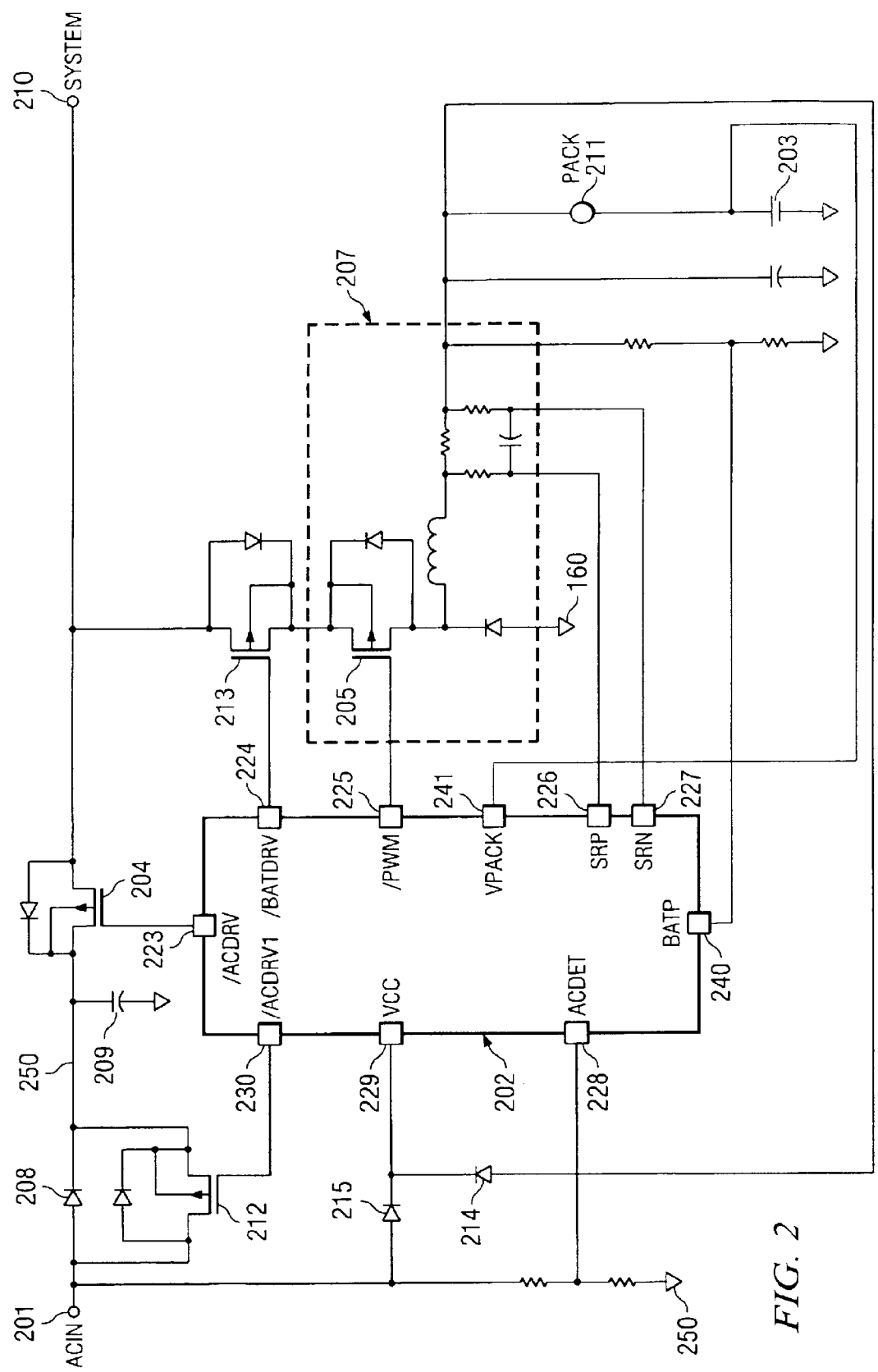
FIG. 2 illustrates one embodiment of the present invention wherein component count is minimized at the expense of higher series resistance on the current charge path, as compared to the conventional topology presented in FIG. 1.

FIG. 2 illustrates one embodiment of the present invention wherein component count is minimized at the expense of higher series resistance on the current charge path, as compared to the conventional topology presented in FIG. 1.

As seen in FIG. 2, power for the system derives either from an external power source, e.g., an AC wall source, introduced at adapter terminal 201, or from an internal source, such as a battery 203, introduced at terminal 211. Power is output to the system at system terminal 210. Controller 202 drives transistors 204 and 213 to switch between adapter terminal 201 and battery terminal 211, and further, as seen therein, regulates power from the adapter terminal 201 to the battery 203 for recharge by controlling buck converter 207. A Schottky diode 208 is added to isolate the adapter voltage 201 from system terminal 210, thus preventing current flow from system terminal 210 to adapter 201 via the backgate diode of switch 204 or from the battery 203 to the adapter terminal 201 when battery 203 is connected to system 210. The buck converter circuit 207 facilitates use of power from the external source at the adapter terminal 201 when the voltage from that source is higher than the battery 203 voltage. The buck converter 207 duty cycle is set by the controller 202 to achieve the desired charge current and charge voltage. The charge current information is fed back to the controller 202 through pins 226 SRP and 227 SRN. The battery 203 voltage is fed back to the controller via pin VPACK 241, the voltage at pin VPACK is compared to the voltage at pin VCC; if VPACK is greater than VCC a battery greater than adapter condition (VPACK>VCC) is detected. In addition to that the duty cycle signal at /PWM pin 225 is level shifted to provide the necessary gate voltage levels for the external PMOS transistor 205. Current through diode 208 is bypassed through transistor 212, thus reducing power dissipation in diode 208 when adapter power is used to power the system and charge the battery pack. Switch 212 is never turned on with a 100% duty cycle. The controller 202 applies a duty cycle smaller than 100% to /ACDRV1 pin 230, effectively turning switch 212 off for a very short time and allowing detection of the removal of an external supply connected to terminal 201. During the time that switch 212 is off, if the external power supply is not available, the voltage at terminal 201 and ACDET pin 228 will collapse, thus enabling terminal 201 power removal detection by controller.

Another improvement in the topology is that transistor 213 is connected in series with transistor 205. This arrangement, together with modifications in the controller logic to allow comparison between the voltages at pins VCC 224 and VPACK 241, enables the implementation of airline mode without additional components in the power management section. The following states related to charge and airline mode are implemented in the controller internal logic:

| AC adapter detected | VCC > VPACK | SWITCH 212 (diode bypass) | SWITCH 204 (ac to system) | SWITCH 213 (batt to system) | SWITCH 205 (pwm ctrl) | MODE |
|---|---|---|---|---|---|---|
| NO | Don't care | OFF | OFF | ON | ON | PACK CONNECTED TO SYSTEM |
| YES | YES | PULSED | ON | ON | PWM CONTROL | ADAPTER TO SYSTEM, CHARGING PACK |
| YES | NO | PULSED | ON | OFF | OFF | ADAPTER TO SYSTEM, PACK ISOLATED FROM SYSTEM (AIRLINE MODE) |

Diodes 214 and 215 provide a continuous power path for the controller supply to ensure that a lock-up condition does not exist during power up conditions. This guarantees that controller 202 always has power, independently of the state of switches 205, 213, 204 and 212 whenever an external supply is connected to terminal 201 or a pack is connected to terminal 211. The inrush current during adapter insertion is minimized by connecting the buck converter switch driver to the system terminal 210. This allows a reduction in the value of capacitor 209 connected to node 250. Capacitor 209 in the present invention is dimensioned only to filter transients at node 250. Note that the same configuration used in FIG. 1 can still be implemented by connecting switch 213 to node 250 without affecting the implementation of this embodiment of the present invention.

Figure 3:
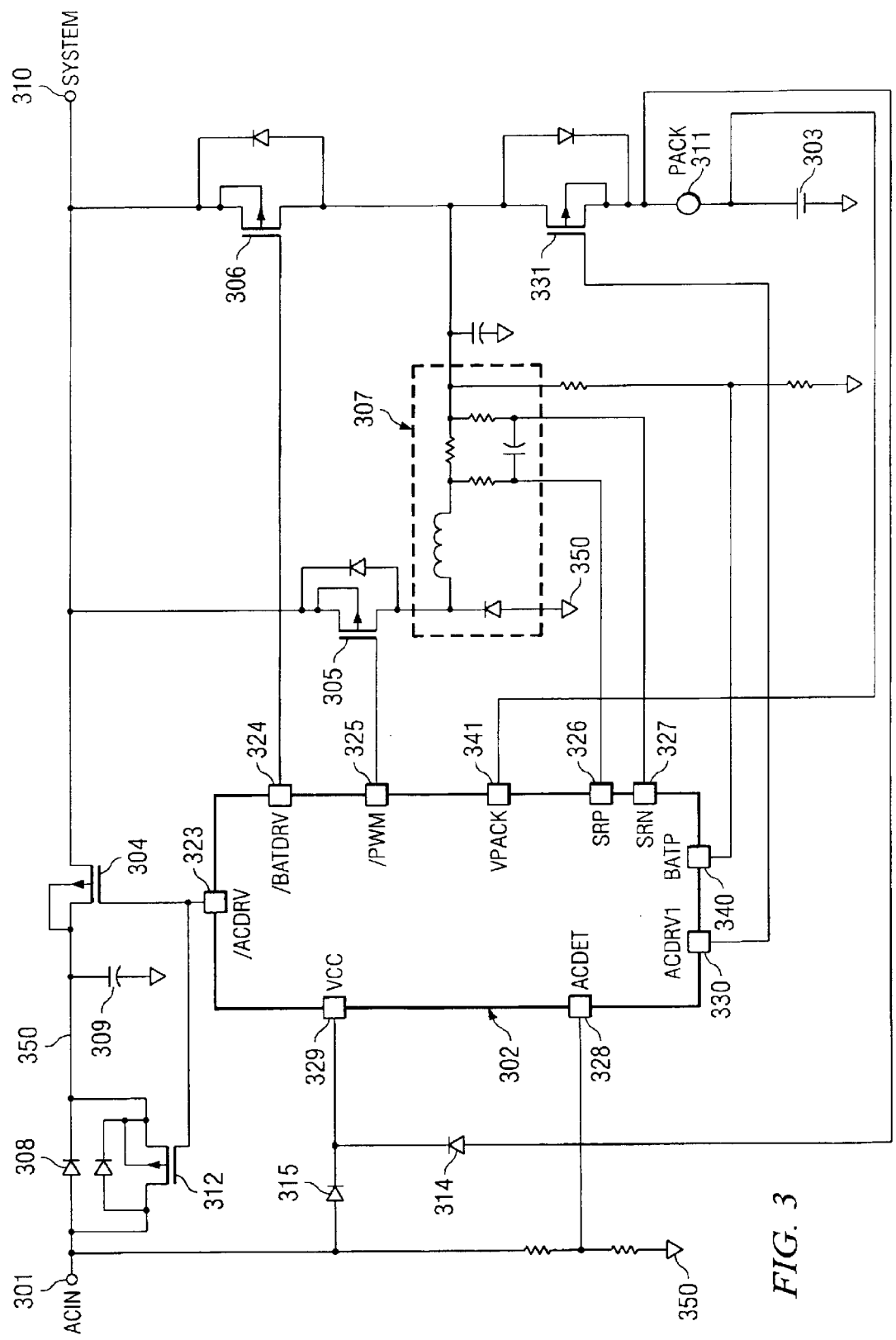
FIG. 3 illustrates an alternative embodiment of the present invention with lower series resistance on current charge path, when compared to the embodiment presented in FIG. 2.

FIG. 3 illustrates an alternative embodiment of the present invention with lower series resistance on current charge path, when compared to the embodiment presented in FIG. 2.

source, such as a battery 303, introduced at terminal 311. Power is output to the system at system terminal 310. Controller 302 drives transistors 304 and 306 to switch between adapter terminal 301 and battery terminal 311, and further, as seen therein, regulates power from the adapter terminal 301 to the battery 303 for recharge by controlling buck converter 307. A Schottky diode 308 is added to isolate the adapter voltage 301 from system terminal 310. The buck converter circuit 307 facilitates use of power from the external source at the adapter terminal 301 when the voltage from that source is higher than the battery 303 voltage. The buck converter 307 duty cycle is set by the controller 302 to achieve the desired charge current and charge voltage. The charge current information is fed back to the controller 302 through pins 326 SRP and 327 SRN. The battery 303 voltage is fed back to the controller via a resistive divider connected to pin BATP 340. In addition to that the duty cycle signal at /PWM pin 325 is level shifted to provide the necessary gate voltage levels for the external PMOS transistor 305.

This arrangement, together with modifications in the controller logic to allow comparison between the voltages at pins VCC 329 and VPACK 341, enables the implementation of airline mode without additional switches in series with the PWM converter switch. The battery pack is charged by the buck converter 307. The following states related to charge and airline mode are implemented in the controller internal logic:

| AC adapter detected | VCC > VPACK | SWITCH 312 (diode bypass) | SWITCH 304 (ac to system) | SWITCH 306 (batt to system) | SWITCH 305 (pwm ctrl) | SWITCH 331 (airline) | OPERATION MODE |
|---|---|---|---|---|---|---|---|
| NO | Don't care | OFF | OFF | ON | OFF | ON | PACK CONNECTED TO SYSTEM |
| YES | YES | PULSED | ON | OFF | PWM CONTROL | ON | ADAPTER TO SYSTEM, CHARGING PACK |
| YES | NO | PULSED | ON | OFF | OFF | OFF | ADAPTER TO SYSTEM, PACK ISOLATED FROM SYSTEM (AIRLINE MODE) |

As seen in FIG. 3, power for the system derives either from an external power source, e.g., an AC wall source, introduced at adapter terminal 301, or from an internal Diodes 314 and 315 provide a continuous power path for the controller supply to ensure that a lock-up condition does not exist during power up conditions. This guarantees that the controller always has power, independently of the state of switches 305, 306, 304 and 312 whenever an external supply is connected to terminal 301 or a battery pack is connected to terminal 311. The inrush current during adapter insertion is minimized by connecting the buck converter switch driver to the system terminal 310. This allows a reduction in the value of capacitor 309 connected to node 350. Capacitor 309 is dimensioned only to filter transients at node 350. Note that the same configuration used in FIG. 1 can still be implemented by connecting switch 306 to node 350 without affecting the implementation of this invention.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A power management circuit, comprising:
   a circuit topology with an;
      an adapter terminal;
      a Schottkey diode;
      a MOS transistor
   a modified logic control circuit which is adapted to enable current to flow through the MOS transistor so as to bypass the Schottky diode when used in series with an AC adapter coupled to the adapter terminal.

2. The power management circuit of claim 1, wherein the circuit topology further comprises:
   a battery pack;
   a system terminal;
   the circuit topology operable to reduce the amount of power through the Shottkey diode and open the discharge path from a battery pack to the system terminal when the voltage at the adapter terminal is less than the battery voltage.

3. The power management circuit of claim 2, further comprising:
   a capacitive load across the adapter terminal, the capacitive load having a reduced value;
   the capacitive load being operable to handle inrush current during insertion of a power source at the adapter terminal.

4. The power supply management circuit of claim 1, further comprising:
   the adapter terminal being connectable to an external power source, said adapter terminal being coupled into the power supply management section;
   an adapter diode, the anode thereof being coupled to said adapter terminal, the cathode thereof being coupled to the remainder of the power supply management circuit;
   said adapter diode being operable to isolate an external power source from back current from the power supply management section;
   an internal power source terminal being connectable to an internal power source, said internal power source terminal being connected into the power supply management section;
   a ground terminal, one end of said ground terminal being coupled to ground, the other end being switchably coupled into the power supply management section for completing a plurality of current loops through said power supply management section;
   a system terminal at the output of said power supply management section for accepting a system to be powered from said external power source or said internal power source through said power supply management section;
   a logic controller circuit;
   the Vcc pin of said logic controller circuit being coupled to the anode of the adapter diode;
   the Vcc pin of said logic controller also being coupled to the internal power source terminal;
   a first plurality of transistors for directing current from said adapter terminal through said power supply management section to said system terminal;
   a bypass transistor of said first plurality of transistors being coupled across the adapter diode, operable to bypass current around said adapter diode when switched on by said logic controller circuit;
   a PWM filter capacitor, said PWM capacitor being coupled across the drain node of the system terminal and ground;
   a second plurality of transistors for switching current from said internal power source terminal to said system terminal;
   a battery switch transistor of said second plurality of transistors, for directing current from said internal power source connected to the internal power source terminal to said system terminal for powering a system;
   a charging transistor of said second plurality of transistors for directing current to said internal power source for recharging;
   said logic controller circuit having an algorithm for controlling the gates of said first plurality of transistors, said second plurality of transistors and said charging transistor;
   a buck converter being operably connected to said charging transistor and internal power source terminal for sensing voltage levels at said internal power source; and
   said buck converter circuit being adapted to sense and feed back to said controller the voltage across the internal power source so as to regulate said recharging.

5. The power management circuit of claim 1, wherein the circuit topology further comprises:
   a logic controller with three modes;
      a battery pack coupled to and powering a system mode;
      an adapter coupled to and powering a system with battery pack being charged mode;
      an adapter coupled to a system with a battery pack being isolated from the system mode;
   the battery pack coupled to and powering a system mode enabled when;
      no AC adapter is detected at the adapter terminal;
      don't care if VCC is greater than VPACK;
      a diode bypass transistor is off;
      an AC to system transistor is off;
      a battery to system transistor is on;
      a PWM control transistor is on;
   the adapter coupled to and powering a system with battery pack being charged mode enabled when;
      an AC adapter is detected;
      VCC is greater than VPACK;
      a diode bypass transistor is pulsed;
      an AC to system transistor is on;
      a battery to system transistor is on;

a PWM control transistor is controlled by a PWM signal; and the adapter coupled to a system with a battery pack being isolated from the system mode enabled, when;
an AC adapter is detected;
VCC is not greater than VPACK;
a diode bypass transistor is pulsed;
an AC to system transistor is on;
a battery to system transistor is off;
a PWM control transistor is off.

6. A power supply management logic circuit, said circuit comprising a logic controller with three modes;
a battery pack coupled to and powering a system mode;
an adapter coupled to and powering a system with battery pack being charged mode;
an adapter coupled to a system with a battery pack being isolated from the system mode;
the battery pack coupled to and powering a system mode enabled when;
no AC adapter is detected at the adapter terminal;
don't care if VCC is greater than VPACK;
a diode bypass transistor is off;
an AC to system transistor is off;
a battery to system transistor is on;
a PWM control transistor is on;
the adapter coupled to and powering a system with battery pack being charged mode enabled when;
an AC adapter is detected;
VCC is greater than VPACK;
a diode bypass transistor is pulsed;
an AC to system transistor is on;
a battery to system transistor is on;
a PWM control transistor is controlled by a PWM signal; and
the adapter coupled to a system with a battery pack being isolated from the system mode enabled, when;
an AC adapter is detected;
VCC is not greater than VPACK;
a diode bypass transistor is pulsed;
an AC to system transistor is on;
a battery to system transistor is off;
a PWM control transistor is off.

7. A power supply management section, comprising:
an adapter terminal being connectable to an external power source, said adapter terminal being coupled into the power supply management section;
an adapter diode, the anode thereof being coupled to said adapter terminal, the cathode thereof being coupled to the remainder of the power supply management circuit;
said adapter diode being operable to isolate an external power source from back current from the power supply management section;
an internal power source terminal being connectable to an internal power source, said internal power source terminal being connected into the power supply management section;
a ground terminal, one end of said ground terminal being coupled to ground, the other end being switchably coupled into the power supply management section for completing a plurality of current loops through said power supply management section;
a system terminal at the output of said power supply management section for accepting a system to be powered from said external power source or said internal power source through said power supply management section;

a logic controller circuit;
the Vcc pin of said logic controller circuit being coupled to the anode of the adapter diode;
the Vcc pin of said logic controller also being coupled to the internal power source terminal;
a first plurality of transistors for directing current from said adapter terminal through said power supply management section to said system terminal;
a bypass transistor of said first plurality of transistors being coupled across the adapter diode, operable to bypass current around said adapter diode when switched on by said logic controller circuit;
a PWM filter capacitor, said PWM capacitor being coupled across the drain node of the system terminal and ground;
a second plurality of transistors for switching current from said internal power source terminal to said system terminal;
a battery switch transistor of said second plurality of transistors, for directing current from said internal power source connected to the internal power source terminal to said system terminal for powering a system;
a charging transistor of said second plurality of transistors for directing current to said internal power source for recharging;
said logic controller circuit having an algorithm for controlling the gates of said first plurality of transistors, said second plurality of transistors and said charging transistor;
a buck converter being operably connected to said charging transistor and internal power source terminal for sensing voltage levels at said internal power source; and
said buck converter circuit being adapted to sense and feed back to said controller the voltage across the internal power source so as to regulate said recharging.

8. The power supply management section of claim 7, wherein said controller is adapted to sense differential signals from said buck converter and output a pulse width modulated signal to the gate of said charging transistor to regulate charging of an internal power source.

9. The power supply management section of claim 8, further comprising a first diode being interposed between the Vcc pin of said logic controller and anode of the adapter diode; and
a second diode being interposed between the Vcc pin of said logic controller and the internal power source terminal.

10. The power supply management section of claim 8, wherein said battery switch transistor and said charging transistor comprise PMOS transistors;
the gate of said battery switch transistor being coupled to a battery drive pin of said controller;
the gate of said charging transistor being coupled to a PWM driver of said controller;
said battery switch transistor and charging transistor being coupled, source to source;
the drain of said charging transistor being coupled to the node connecting the buck converter; and
the drain of said battery switch transistor being coupled to a node between the system terminal and the PWM filter capacitor.

11. The power supply management section of claim 8, further comprising said logic controller circuit being adapted to output a pulse width modulated signal to the gate of said charging transistor dependent on the feedback signal into said logic controller circuit from the buck converter circuit.

12. The logic controller circuit of the power supply management section of claim 11, wherein the logic further comprises three modes:
   a battery pack coupled to and powering a system mode;
   an adapter coupled to and powering a system with battery pack being charged mode;
   an adapter coupled to a system with a battery pack being isolated from the system mode;
the battery pack coupled to and powering a system mode enabled when;
   no AC adapter is detected at the adapter terminal;
   don't care if VCC is greater than VPACK;
   a diode bypass transistor is off;
   an AC to system transistor is off;
   a battery to system transistor is on;
   a PWM control transistor is on;
the adapter coupled to and powering a system with battery pack being charged mode enabled when;
   an AC adapter is detected;
   VCC is greater than VPACK;
   a diode bypass transistor is pulsed;
   an AC to system transistor is on;
   a battery to system transistor is on;
   a PWM control transistor is controlled by a PWM signal; and
the adapter coupled to a system with a battery pack being isolated from the system mode enabled, when;
   an AC adapter is detected;
   VCC is not greater than VPACK;
   a diode bypass transistor is pulsed;
   an AC to system transistor is on;
   a battery to system transistor is off;
   a PWM control transistor is off.

13. The power supply management section of claim 7, further comprising said first plurality of transistors, said second plurality of transistors and said charging transistor comprising MOS transistors.

14. The power supply management section of claim 13, further comprising said MOS transistors comprising PMOS transistors.

15. The power supply management section of claim 7 being adapted to operate in airline mode.

16. The power supply management section of claim 7, wherein said internal power source comprises a battery pack.

17. The power supply management section of claim 7, wherein said external power source comprises an AC wall adapter.

18. The power supply management section of claim 7, wherein said external power source comprises a DC power source.

19. The power supply management section of claim 7, for use in a laptop computer.

20. The PWM filter capacitor of claim 7 further comprising a low value capacitor adapted to minimize sparking in the event of AC adapter bounce at said adapter terminal.

21. A logic circuit for controlling current applied to system and battery pack, the logic circuit being comprising three modes:
   a battery pack coupled to and powering a system mode;
   an adapter coupled to and powering a system with battery pack being charged mode;
   an adapter coupled to a system with a battery pack being isolated from the system mode;
the battery pack coupled to and powering a system mode enabled when;
   no AC adapter is detected at the adapter terminal;
   don't care if VCC is greater than VPACK;
   a diode bypass transistor is off;
   an AC to system transistor is off;
   a battery to system transistor is on;
   a PWM control transistor is on;
the adapter coupled to and powering a system with battery pack being charged mode enabled when;
   an AC adapter is detected;
   VCC is greater than VPACK;
   a diode bypass transistor is pulsed;
   an AC to system transistor is on;
   a battery to system transistor is on;
   a PWM control transistor is controlled by a PWM signal; and
the adapter coupled to a system with a battery pack being isolated from the system mode enabled, when;
   an AC adapter is detected;
   VCC is not greater than VPACK;
   a diode bypass transistor is pulsed;
   an AC to system transistor is on;
   a battery to system transistor is off;
   a PWM control transistor is off.

22. The logic circuit for controlling current applied to system and battery pack, of claim 21, being implemented with a micro-controller circuit.

* * * * *